May 3, 1938.　　　L. H. CAMPOS　　　2,116,300
AIRTIGHT COFFEE CONTAINER
Filed May 25, 1937
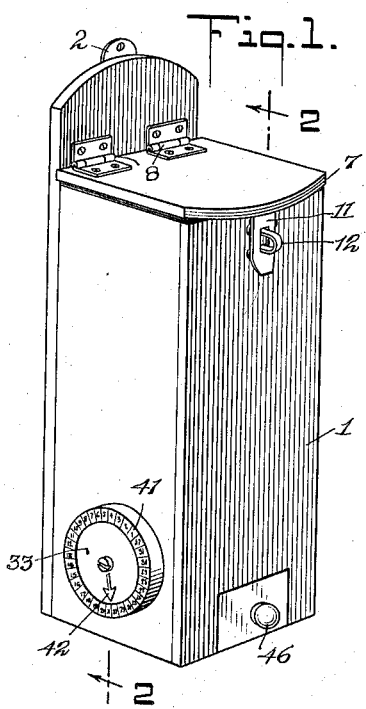
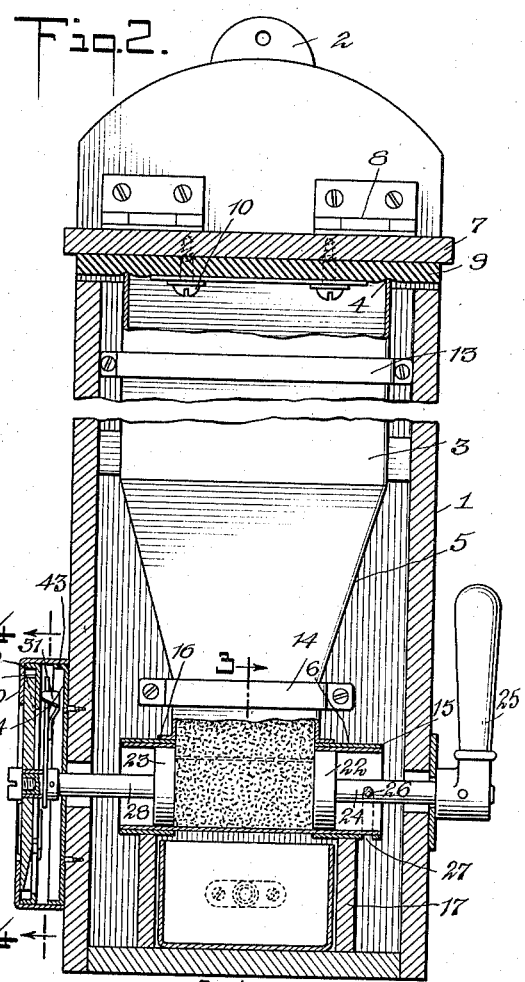
WITNESSES
INVENTOR
Louis H. Campos
BY
ATTORNEYS Patented May 3, 1938

2,116,300

UNITED STATES PATENT OFFICE 2,116,300

AIRTIGHT COFFEE CONTAINER

Louis H. Campos, New York, N. Y.

Application May 25, 1937, Serial No. 144,635

2 Claims. (Cl. 221—106)

This invention relates to a coffee container, and particularly to an improved airtight container which will preserve the aroma of coffee while permitting the same to be vended in batches.

An object of the invention is to provide an improved construction which is simple and which may be easily operated without the exercise of skill.

Another object of the invention is to provide a vending coffee container provided with a dispensing measuring valve at the bottom and means for indicating the number of batches of coffee dispensed and the number remaining in the container or receptacle.

An additional object of the invention is to provide a dispensing coffee container wherein means are provided for receiving the dispensed batches of coffee to permit a ready removal thereof without using any outside receptacles.

An additional and more specific object of the invention is to provide a coffee container provided with dispensing means and a sliding drawer for receiving the dispensed coffee, the various parts being associated with spring means whereby the coffee may be shaken down in the drawer before the drawer is removed.

In the accompanying drawing:

Fig. 1 is a perspective view of an airtight coffee container disclosing an embodiment of the invention;

Fig. 2 is a longitudinal vertical sectional view through Fig. 1 approximately on the line 2—2;

Fig. 3 is a fragmentary sectional view through Fig. 2 approximately on the line 3—3;

Fig. 4 is a sectional view on an enlarged scale through Fig. 2 on the line 4—4.

Referring to the accompanying drawing by numerals, 1 indicates a casing which may be wood or other material and which is provided with an apertured extension 2 whereby the device may be hung on the wall. Arranged in the casing 1 is a receptacle 3 made of any desired material, as for instance sheet metal, and provided with an open top 4 with a tapering bottom portion 5 which is open and in free communication with a valve 6 when the same is in a certain position. A closure plate 7 is secured to the casing 1 by suitable hinges 8 and is provided with a rubber gasket or plate 9 held in place by any suitable means, as for instance screws 10. Some other form of gasket may be used but a good grade of rubber is found to be desirable and it is pressed against the upper edge of the container 3 as shown in Fig. 2 when the closure is in a closed position as shown in Fig. 1. This provides for an airtight structure at the upper end or top of the receptacle 3. A hasp 11 is connected with the plate 7 and is adapted to fit over the U-shaped member or staple 12 for locking the closure in a closed position. The receptacle 3 may be secured in the casing 1 in any suitable manner, as for instance by the clamping straps 13 and 14.

As shown in Figs. 2 and 3, the valve 6 is provided with a tubular casing 15 which is preferably secured to the flanges 16 of the receptacle 3. This casing is stationary and may rest on suitable supports 17 if desired. Casing 15 is provided with a slot 18 at the top and a similar slot 19 at the bottom. The slot 18 provides for continuous communication with the receptacle 3 as shown in Fig. 3. A rotating member or part 20 is positioned within the casing 15 but presents a substantially airtight connection therewith although rotatable therein. The part 20 has a single slot or opening 21 which registers with the slot 18 when coffee is being discharged into the part 20. When coffee is to be discharged therefrom the rotating part 20 is rotated for one-half of a revolution so that the slot 21 will be in registry with the lower slot 19 of the tubular casing 15. By reason of this construction the coffee is received into the rotating part and then discharged therefrom. During the discharging of the coffee from the rotating part the lower end of the receptacle 3 is closed substantially airtight.

From Fig. 2 it will be noted that disks 22 and 23 are rigidly secured to the rotating part 20. These disks may be secured by welding or in any desired manner and coact with the tubular part 20 to form a chamber which really acts as a measuring chamber and determines the amount of coffee to be discharged at one batch. A shaft 24 is rigidly secured to disk 22 and extends to a position exteriorly of the casing 1 whereby an operating handle or lever 25 may be rigidly secured thereto. A pin 26 is secured to the shaft 24 and extends into a slot 27 whereby the rotary movement of shaft 24, part 20 and associated parts will be limited. The slot 27 is of sufficient length to permit the rotating part 20 to move through a 180 degree arc or a half revolution and then move back to a former position. Disk 23 is rigidly secured to the auxiliary shaft 28, which in turn is rigidly secured to a rocking or reciprocating pawl 29. Pawl 29 is provided with a flat spring 30 having an extension 31 which is at a slight angle to the body of the spring. The extension 31 is adapted to engage the various teeth 32 one at a time and move the disk 33. Teeth 32 are preferably cut into disk 33 and are normally covered by a ring 34 except at the cutaway part 35. The ring 34 at the cutaway part 35 is provided with a beveled edge 36 so that the extension 31 may readily slide into the cutaway part, engage a tooth 32 and move the same the distance of one tooth. An auxiliary pawl 37 is carried by ring 34 and acts through the slot 38 to permit the teeth 32 to move in one direction but not in the opposite direction.

As shown in Fig. 2 the parts just described are arranged in a casing 39, which casing is provided with an inturned flange 40 on which the graduations 41 are positioned. The graduations 41 include numbers arranged in a circle for indicating the number of batches in the receptacle 3 when the same is filled. When the valve 6 has been actuated or discharged in one batch of coffee the pointer 42 on the disk 33 will be moved the distance of one of the numbers on the graduations 41. This will indicate that one batch of coffee has been discharged and will also indicate how many batches have been left. It will be understood that the ring 34 is welded or otherwise rigidly secured to the casing 39 as shown in Fig. 2 and that the casing 39 is preferably held in position by friction with the upstanding flange 43 of a plate 44 secured to the casing 1 by screws or other means.

Arranged below the valve 6 and between the supports 17 is a sliding drawer 45 open at the top and provided with a suitable knob 46 whereby it may be readily inserted or removed. The drawer 35 is loosely positioned in place and is moved into position through a suitable opening 47 in the casing 1. A spring 48 is secured to the casing 1 by a suitable mounting 49 and acts to resiliently hold the drawer 45 in the position shown in Fig. 3. When a batch of coffee is dropped into the drawer by the valve 6 it naturally will form itself into a pile in the center of the drawer and some of the coffee might spill out if the drawer was immediately pulled out. The spring 48 has been provided so that under these circumstances if anyone taps the knob 46 it will force the drawer 45 inwardly a short distance against the action of spring 48 and spring 48 will again force the drawer outwardly. This quick and rather jerky back and forth movement will shake the coffee so that it will move down into the drawer. The drawer may then be removed and the coffee used as desired.

In case more than one batch of coffee is desired it will only be necessary to operate the valve as often as a new batch is desired. Normally the parts are left in the position shown in Fig. 2 and when a batch of coffee is desired handle 25 is grasped and rotated for half a revolution. This will cause the discharge of one batch into the drawer 45. In case the drawer should be removed with the handle turned down the receptacle will remain sealed airtight. As soon as the handle 25 is moved back to the position shown in Fig. 3 a quantity of coffee will drop down into the valve so as to fill the same, but the valve will still maintain the sealed condition by reason of the rotating part 20 closing the opening 19. It will thus be seen that at all times the receptacle 3 is maintained closed against the entrance of air and thus the aroma of the coffee is retained. It is to be understood that the parts are so proportioned that opening 18 is closed by member 20 before the opening 21 begins to register with opening 19. After all of the coffee has been vended or discharged from the receptacle 3 or at any suitable time before this occurs the closure 7 may be raised and a new supply of ground coffee provided.

While the device is intended particularly for coffee and for maintaining the coffee in its original condition with all the aroma present, the device could be used for other ground or granular matter without departing from the spirit of the invention.

I claim:

1. A container for coffee comprising a receptacle, a measuring valve at the bottom of said receptacle, means actuated by said valve for indicating the number of batches of coffee left in the receptacle, said means comprising a casing having an inturned flange, graduations positioned on said flange arranged in a circle, a rotatable disk positioned adjacent said flange formed with a pointer positioned to point at said graduations, said disk on one face at the periphery being formed with as many teeth as said graduations are provided with division marks, a ring having a cutaway part overlapping said disk and acting with said flange for holding said disk in place, said cutaway part exposing a few teeth of said disk, a shaft secured to and rocked by said valve, a pawl rigidly secured to said shaft and positioned to move over one face of said ring, said pawl having a spring provided with an extension adapted to move through said cutaway part of said ring and engage one of the teeth of said disk and move the disk the distance of one tooth on each actuation of the pawl, and a second pawl for preventing momentum in said disk.

2. A container for dispensing coffee without admitting fresh air each time a batch of coffee is dispensed, comprising a hopper having a body open at the top and tapering at the bottom into an outlet tube having a substantially rectangular outlet opening longer than it is wide, means forming an airtight cover for the top of said body, a tubular member open at both ends extending parallel to the long way of said outlet opening and filling the same, said tubular member being permanently secured to said tube and formed with an opening in the top and an opening in the bottom in alignment with the outlet opening of said tube, a tubular valve key rotatably positioned in said tubular member, said key being closed at both ends and formed with a single opening between the ends of a size and shape substantially the same as the opening in the bottom of the tubular member, a hand actuated structure secured to said key for rocking the same so that at one time the opening therein will register with the top opening of said tubular member for receiving ground coffee from said tube and at another time will register with the bottom opening in said tubular member for discharging the ground coffee in the key without exposing the coffee in the hopper to fresh air, and a drawer arranged beneath said tubular member to receive coffee discharged therefrom.

LOUIS H. CAMPOS.